United States Patent [19]

Stroud

[11] 4,336,485
[45] Jun. 22, 1982

[54] DUAL ALTERNATOR FEEDBACK SYSTEM

[76] Inventor: Lebern W. Stroud, 3237 Gerome, Fort Worth, Tex. 76118

[21] Appl. No.: 153,426

[22] Filed: May 27, 1980

Related U.S. Application Data

[63] Continuation-in-part of Ser. No. 33,443, Apr. 26, 1979.

[51] Int. Cl.³ ................................................ H02J 7/14
[52] U.S. Cl. ...................................... 320/15; 322/90; 307/18; 307/84
[58] Field of Search ................ 320/6, 15, 61; 322/89, 322/99, 90, 88; 307/16, 57, 84, 18

[56] References Cited

U.S. PATENT DOCUMENTS

| | | | |
|---|---|---|---|
| 1,898,370 | 2/1933 | Hughes et al. | 320/6 X |
| 2,859,357 | 11/1958 | Schmeling | 307/57 |
| 2,859,358 | 11/1958 | King | 307/57 |
| 3,603,853 | 9/1971 | Mackay | 322/88 X |
| 4,156,836 | 5/1979 | Wiley | 307/84 X |

FOREIGN PATENT DOCUMENTS 1151694 5/1969 United Kingdom ................ 320/15

Primary Examiner—Robert J. Hickey
Attorney, Agent, or Firm—Arthur F. Zobal

[57] ABSTRACT

In an emergency vehicle, a feedback system for dual alternators employed to charge two batteries and wherein one battery is employed to supply power for the vehicle chassis electrical system and the emergency equipment load is supplied with power directly from the outputs of the two alternators. A separate regulator is provided for each alternator for regulating the voltage applied to its alternator. The output of each alternator is connected to the input of its regulator by way of a diode.

1 Claim, 5 Drawing Figures

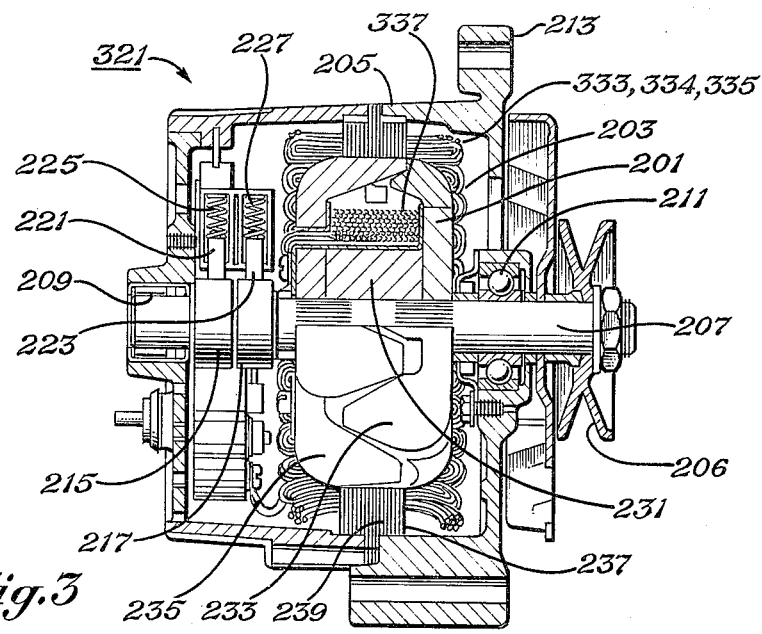
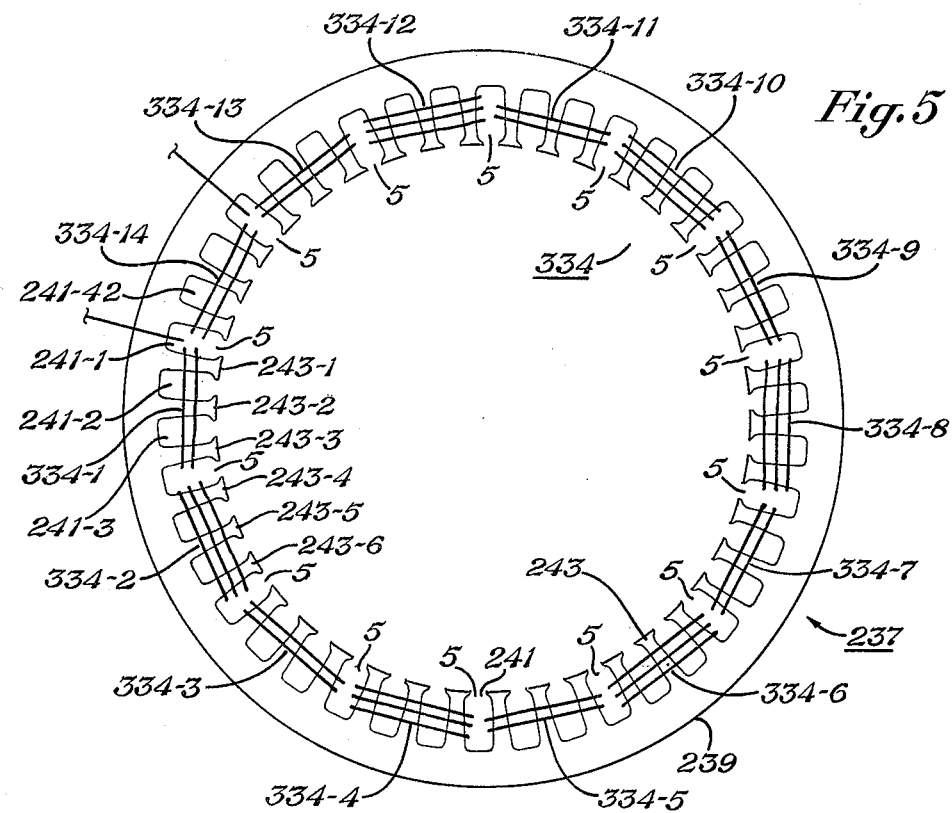

DUAL ALTERNATOR FEEDBACK SYSTEM

This application is a continuation-in-part of U.S. patent application Ser. No. 33,443, filed Apr. 26, 1979.

DESCRIPTION OF THE PRIOR ART

U.S. patent application Ser. No. 33,443 discloses an emergency vehicle electrical power system having dual batteries, one of which is employed for supplying power to the electrical system of the vehicle chassis and the other of which is employed for supplying power to the emergency equipment. Dual alternators driven by the engine are provided for charging the batteries. The output of each alternator is connected to the input of its regulator by way of a diode. U.S. patent application Ser. No. 33,443 is incorporated herein by reference.

SUMMARY OF THE INVENTION

It is an object of the present invention to provide in an emergency vehicle, a feedback system for dual alternators employed to charge two batteries and wherein one battery is employed to supply power for the vehicle chassis electrical system and the emergency equipment load is supplied with power directly from the outputs of the two alternators. A separate regulator is provided for each alternator for regulating the voltage applied to its alternator. The output of each alternator is connected to the input of its regulator by way of a diode.

BRIEF DESCRIPTION OF THE DRAWINGS

FIG. 3 is a cross section of an alternator.

FIG. 5 is a plan view of the stator core of an alternator with the coil winding of FIG. 4 installed around its segments.

DESCRIPTION OF THE SYSTEM OF FIG. 1

Figure 1:
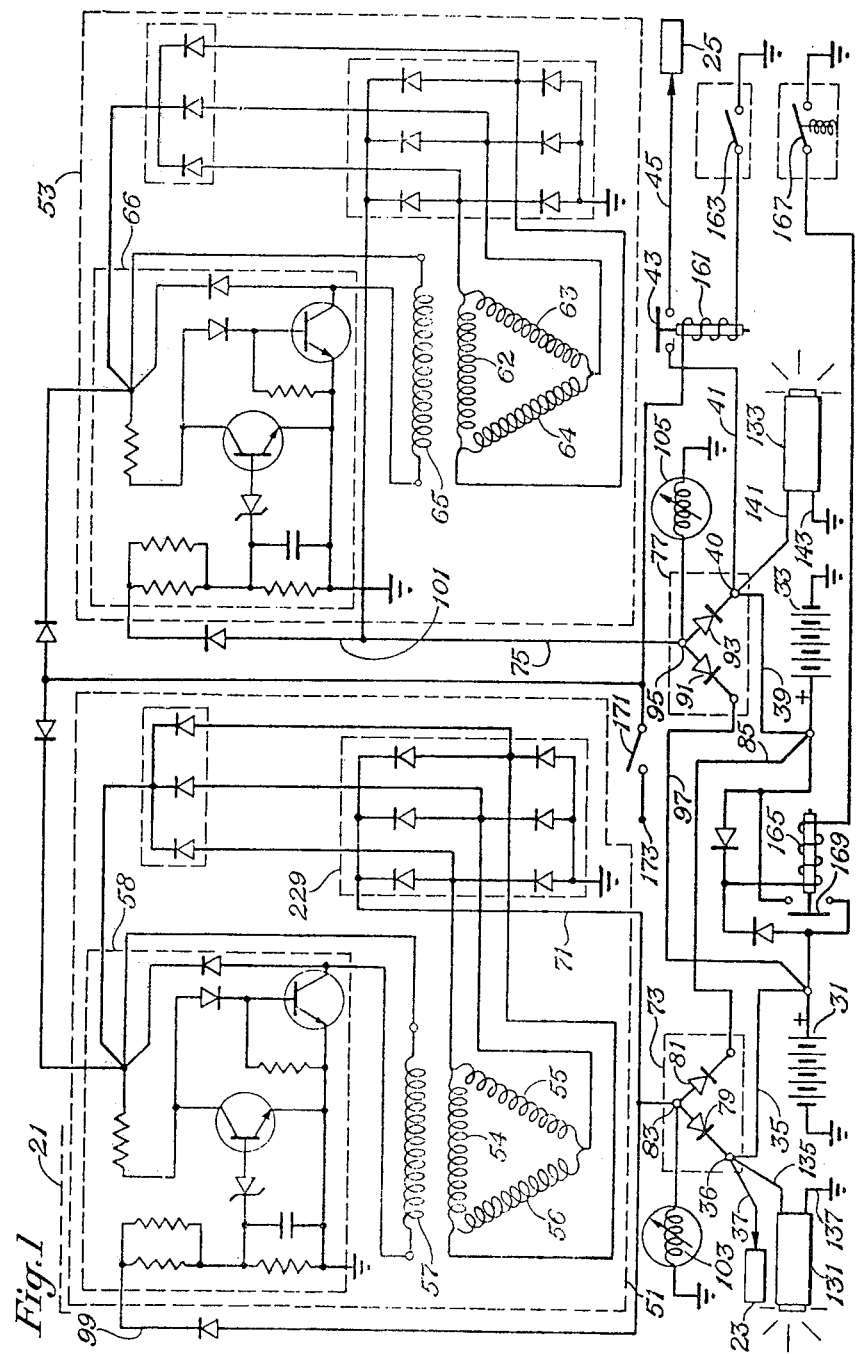
FIG. 1 is an electrical schematic of the electrical system disclosed in U.S. patent application Ser. No. 33,443.

Referring to FIG. 1, dotted line 21 identifies an emergency vehicle such as an ambulance. In FIG. 1, the vehicle chassis electrical system such as the lights, radio, heating and cooling system, starting circuit, ignition circuit, etc. is depicted by block 23. The electrically operated emergency equipment carried by the ambulance such as a heart machine, breathing equipment, vacuum pumps, lights, power outlets, etc. is depicted by block 25. The ambulance may be of the modular type comprising a module carried by the vehicle frame with the module carrying the emergency equipment.

In the system of FIG. 1, two twelve volt batteries 31 and 33 are provided for operating the chassis electrical system 23 and the emergency equipment 25. The plus terminal of battery 31 is coupled to the chassis electrical system 23 by way of lead 35 juncture 36 and lead 37. The plus terminal of battery 33 is coupled to the emergency equipment 25 by way of lead 39 juncture 40, lead 41, modual power relay switch 43, when closed, and lead 45.

Two alternators illustrated in dotted lines 51 and 53 are provided for maintaining the batteries 31 and 33 charged. Each alternator comprises a 3-phase delta winding for its stator core. In alternator 51, the three windings of the stator connected in a delta configuration are identified at 54, 55 and 56. The rotor coil is identified at 57. The regulator is shown in the dotted block 58. In alternator 53, three windings of the stator connected in a delta configuration are identified at 62, 63 and 64. The rotor coil is identified at 65. The regulator is shown in the dotted block 66.

The output lead 71 of the alternator 51 is coupled to the plus terminals of the batteries 31 and 33 by way of an isolator 73. The output lead 75 of the alternator 53 is coupled to the plus terminals of batteries 31 and 33 by way of an isolator 77. Isolator 73 comprises two diodes 79 and 81 having their anodes coupled together at juncture 83 to which the output 71 of alternator 51 is connected. The cathode of diode 79 is coupled to juncture 36 and hence by way of conductor 35 to the plus terminal of battery 31. The cathode of diode 81 is coupled to the positive terminal of battery 33 by way of electrical lead 85. Isolator 77 comprises two diodes 91 and 93 having their anodes coupled together at juncture 95 to which the output 75 of alternator 53 is connected. The cathode of diode 93 is coupled to juncture 40 and hence by way of electrical lead 39 to the plus terminal of battery 33. The cathode of diode 91 is coupled to the positive terminal of battery 31 by way of electrical lead 97.

The input lead 99 of regulator 58 is coupled to the output 71 of alternator 51 and the input lead 101 of regulator 66 is coupled to the output 75 of alternator 53.

With the system of FIG. 1 as described above wherein the output of each alternator is connected to the input of its regulator and to both batteries, both alternators will be on at all times while the engine is running and will share the load on either or both of the batteries. This allows the power requirements of the vehicle and its emergency equipment to be met and provides a balanced dual alternator system which results in longer alternator lifetime. Alternator lifetime further is increased by having both alternators on at all times while the engine is running. In this respect if an alternator is electrically turned off while the engine is running its rotor will continue to turn with no current to the rotor. This has been found to be undesirable since it results in premature deterioration of the brushes of the alternator and hence reduces the lifetime of the alternator. This problem is avoided by the present system. Moreover, with the present system, if one alternator should fail, the other alternator will supply current to both batteries thereby providing a backup system until the operator can get the ambulance into the shop to repair the inoperative alternator. Volt meters 103 and 105 located in the cab of the ambulance are coupled to the output leads 71 and 75 of alternators 51 and 53 respectively to allow the operator to monitor their voltage outputs.

In order to minimize complete failure of the system in the event of belt breakage, each alternator is driven by a separate belt from the crank or drive shaft of the engine.

The purpose of the diodes 79 and 81 of isolator 73 and diodes 91 and 93 of isolator 77 is to prevent the batteries from being discharged through the alternators by way of their output leads 71 and 75 in the event that a short to ground occurs in either of the alternators 51 or 53.

Two battery monitor lamps 131 and 133 are provided to allow the operator to monitor the condition of the batteries 31 and 33 respectively at all times even when the engine of the emergency vehicle is not running. These lamps are located in the cab of the vehicle.

In order for a conventional twelve volt battery to be fully charged, its output voltage at the plus terminal must be at about 12.6 volts. If the battery's output voltage falls below 12.6 volts, serious problems could result since the required electrical power will not be provided for the electrical system of the emergency vehicle chassis and its emergency equipment. Each of the monitor lamps 131 and 133 is constructed such that it will be off if its battery voltage is above about 12.2 volts and will be turned on if its battery voltage falls below about 12.2 volts. If the latter condition occurs, the operator is informed that the lamp's associated battery is down and needs charging or replacement or else the alternators are not producing enough output voltage to maintain the charge. Each of the lamps will monitor its battery at all times regardless of whether the engine is running or is off. Thus, when the vehicle is running or when the operator first enters the vehicle, he will be informed of the condition of the batteries. If either or both lamps are on, the operator will be informed that corrective action is necessary. For example, most ambulances have a throttle control for controlling the rpm of the engine while idling. If an operator drives to a building and leaves the engine idling while he goes into the building ie, for emergency purposes, and if one or both lamps turn on, then he knows that the batteries are in a discharging condition and corrective action can be taken by adjusting the throttle to increase the rpm of the engine until the lamps turn off.

As shown in FIG. 1, lead 135 of monitor lamp 131 is coupled to the plus terminal of battery 31 by way of juncture 36 and lead 35 and its other lead 137 is coupled to ground. Lead 141 of monitor lamp 133 is coupled to the positive terminal of battery 33 by way of juncture 40 and lead 39 and its other lead 143 is coupled to ground.

Other components of the system comprises a module power relay coil 161 operated by a power switch 163 and a fail safe relay 165 operated by a fail safe switch 167. Switches 163 and 167 are located in the cab of the ambulance. In an emergency situation, power switch 163 is closed energizing relay coil 161 which closes relay switch 43. This applies power to the emergency equipment 25. When the ambulance is out of service, the operator will open switch 163 which causes relay coil 161 to be deenergized, opening switch 43.

The purpose of the fail-safe relay 165 and switch 167 is to connect the two batteries 31 and 33 together in the event that one of them fails or is severely down whereby power will be available for the system of the dead battery. For example, if battery 31 is dead and the engine will not start, the operator can obtain starting power by closing switch 167 to energize relay 165. This closes normally open switch 169 to connect the plus terminal of battery 33 with the plus terminal of battery 31.

In FIG. 1, reference numeral 171 identifies the ignition switch of the vehicle. Terminal 173 is connected to the plus terminal of battery 31.

DESCRIPTION OF THE PREFERRED EMBODIMENT

Figure 2:
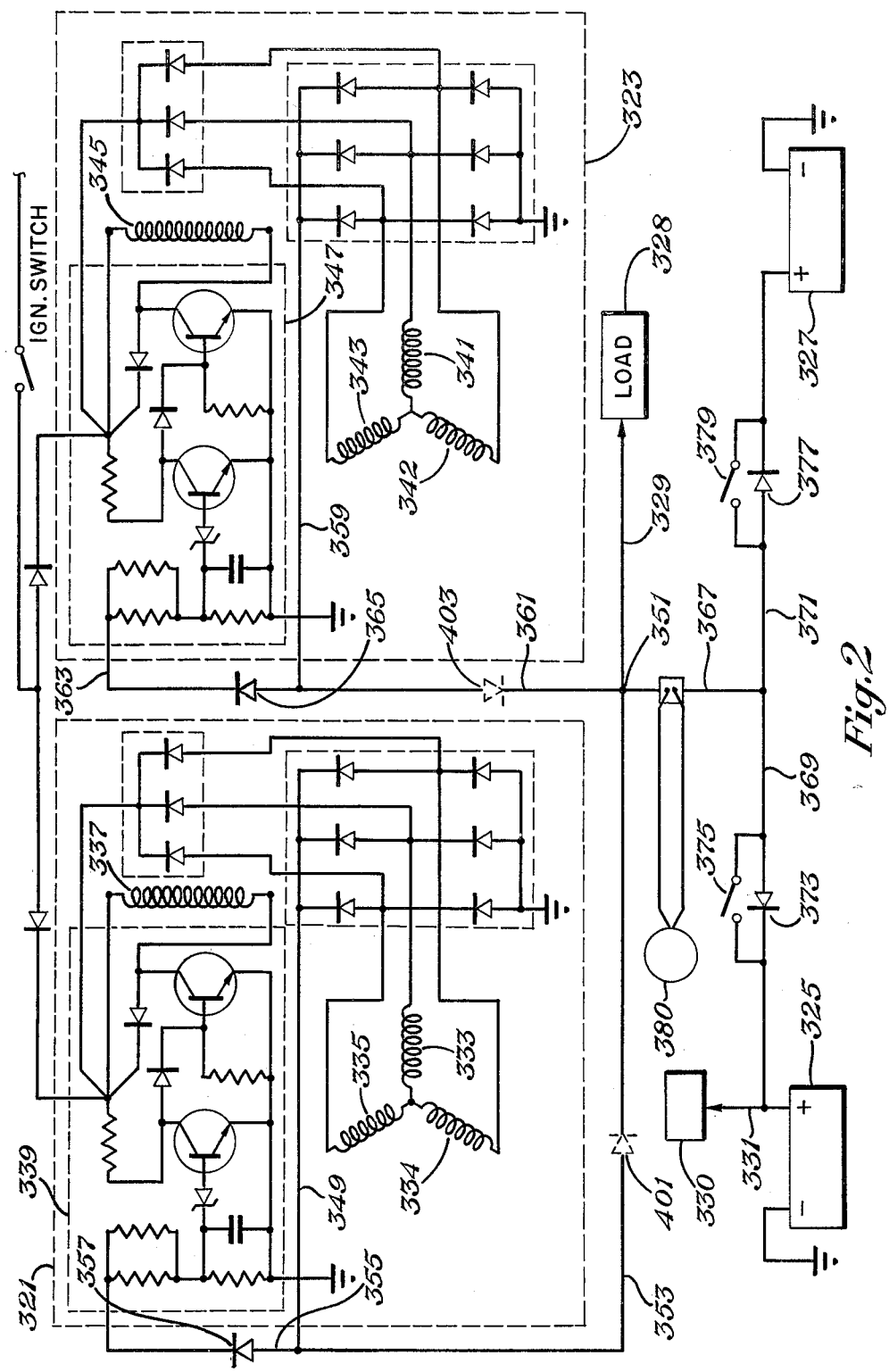
FIG. 2 is an electrical schematic of the electrical system of the present invention.

Referring to FIG. 2, reference numerals 321 and 323 identify two alternators employed for charging two batteries 325 and 327 and for supplying power to emergency equipment load 328 by way of lead 329. One of the batteries (battery 325) supplies power to the vehicle chassis electrical system 330 by way of lead 331. In the preferred embodiment, the motor vehicle is an ambulance and the emergency equipment load comprises emergency equipment carried by the ambulance such as a heart machine, breathing equipment, vacuum pumps, power outlets, etc. The vehicle chassis electrical system comprises the lights, radio, heating and cooling system, starting circuit, ignition circuit, etc.

The batteries 325 and 327 each are twelve volt batteries. Each alternator comprises a 3-phase Y winding for its stator core. In alternator 321, the three windings of the stator connected in a Y configuration are identified at 333, 334 and 335. The rotor coil is identified at 337. The regulator is shown in the dotted block 339. In alternator 323, the three windings of the stator connected in a Y configuration are identified at 341, 342 and 343. The rotor coil is identified at 345. The regulator is shown in the dotted block 347. The rotors of the alternators are turned by the engine of the vehicle.

The output lead 349 of alternator 321 is coupled to juncture 351 by way of lead 353 and to the input to the regulator 339 by way of lead 355 which includes a diode 357. The output lead 359 of alternator 323 is coupled to juncture 351 by way of lead 361 and to the input to the regulator 347 by way of lead 363 which includes a diode 365. Juncture 351 is coupled to both batteries 325 and 327 by way of lead 367 and leads 369 and 371. Diode 373 is coupled to lead 369 and a normally open switch 375 is coupled to lead 369 across the diode. Diode 377 is coupled to lead 371 and a normally open switch 379 is coupled to lead 371 across the diode. Member 380 is an amp-meter coupled to lead 367. With the switches 375 and 379 open, diodes 373 and 377 isolate the batteries from each other. If the starting battery 325 is down, power can be drawn from the other battery by closing the switches 375 and 379. Switches 375 and 379 also may be closed to provide backup from the two batteries to the alternators for supplying power to the load 328 in the event that one or both of the alternators go down. With switches 375 and 379 open, the alternators will be in a regenerative feedback condition. In this respect, the voltage drop across diodes 357 and 365 cause the alternators 321 and 323 to produce a higher output voltage at juncture 351 and thus cause the alternators to be in a regenerative feedback condition. The higher output at juncture 351 insures that there will be enough voltage at the batteries 325 and 327 to maintain the batteries charged.

Figure 4:
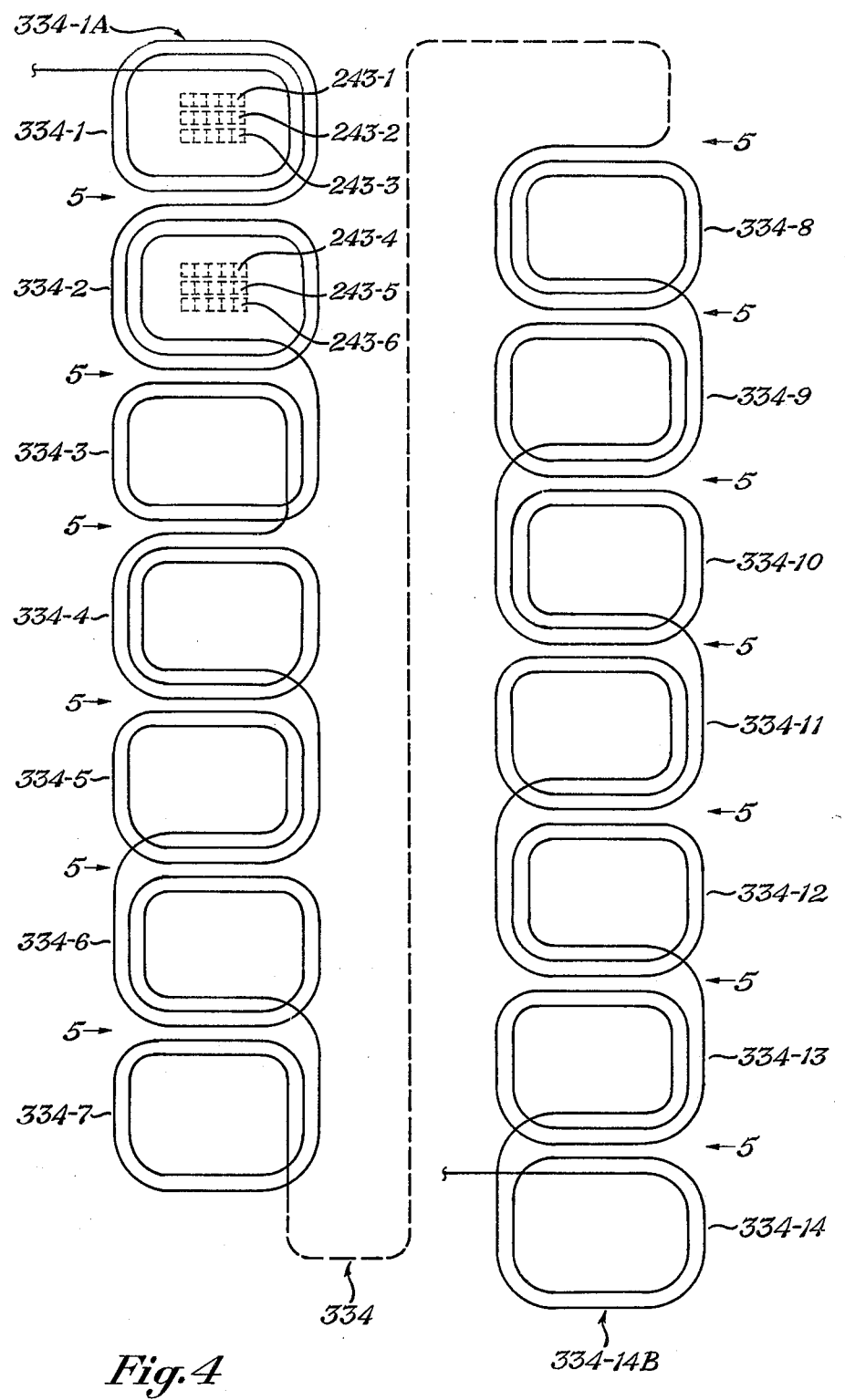
FIG. 4 illustrates the coil winding of one phase of the alternators employed in the system of FIG. 2.

Referring now to FIGS. 3-5, there will be described one of the alternators with its unique coil winding configuration which is of the type used for the dual alternators of the system of FIG. 2. In FIG. 3, the alternator shown is indicated to be alternator 321. Alternator 323 will be constructed in the same manner as alternator 321. As shown in FIG. 3, the alternator 321 comprises a rotor 201 and a stator 203, the latter of which is fixedly carried by a housing or case 205. Rotor 201 is rotatably carried by the case by a shaft 207 which is journaled by roller bearings 209 and ball bearings 211 to the case 205. Brackets 213 formed to the case 205 are adapted to receive bolts for coupling the alternator to mounting means adjacent the engine of the vehicle. A pulley 206 is mounted to the shaft 207 for receiving the belt from the engine for rotating the rotor 201.

Shaft 207 has two slip rings 215 and 217 mounted rigidly to it and insulated from each other and from the shaft. Slip rings 215, 217 are connected by conductors (not shown) to the coil 37 of rotor 201. Carbon brushes 221 and 223 are biased by springs 225 and 227 into sliding contact with the slip rings 215 and 217. Slip rings 215, 217 and brushes 221, 223 provide a connection for applying a D.C. exciting voltage to the rotor 201. A diode rectifier bridge (see FIG. 2) is attached to the inner side of the case 205 and is connected by conductors to the windings 333-335 of the stator 203 for converting the A.C. output to D.C.

Rotor 201 comprises a ferro-magnetic core 231 which is wound with conductive wire defining the rotor coil 337. The opposite sides of the core 231 have end portions which form north and south poles 233 and 235. The poles are formed into seven north poles and seven south poles which extend inward and mesh, but do not touch, with a corresponding pole of the opposite polarity.

Stator 203 comprises an annular core 237 formed of a plurality of stacked ferro-magnetic plates 239. A plan view of the core 237 is shown in FIG. 5. As seen in this figure, there are forty-two slots 241 formed in the stator core 237. Slots 241 extend parallel to the axis of the core 237 the full width of the core.

In the preferred embodiment, the depth of the slots 241 is slightly more than one half of the radial thickness of the core. The core 237 is approximately 5¼ inches in outside diameter, 13/16 of an inch wide longitudinally and 9/16 of an inch thick radially. The slots 241 are approximately 5/16 of an inch deep, being about 1/16 of an inch wide at the entrance and about ¼ of an inch wide at the inner portion. The forty two portions of the core between the slots 241 are defined as segments 243. Rotor 201 is carried within the stator core 237, with the poles 233 and 235 being approximately 0.03 of an inch from segments 243.

The three stator winding 333-335 each comprise fourteen loops or coils which are located in the slots 241 of the core 237. Each coil or loop of each winding encircles three segments 243 of the core. Electrically insulating inserts (not shown) are located in the slots between their wall structure and their wires to prevent electrical contact between the wires and the core. The stator windings are connected in a Y configuration as shown in FIG. 2 in the dashed block 321 which is an electrical schematic of the alternator.

The alternator as described above is similar to a commercially available alternator manufactured by Delco-Remy, a division of General Motors. The Delco alternator uses 15-20 A.W.G. (American Wire Gage) for its three coil windings which are connected in a Y configuration. Each coil of each winding encircles three segments of the core. Adjacent coils of each winding have totally eight turns located in every third slot of the stator core. For a given winding, each coil at one edge has four turns and at the opposite edge adjacent coils have five and three turns. The Delco alternator produces a maximum of about sixty-three amps of current. References made to Buchbaum's Complete Handbook of Practical Electronic Reference Data, by William Buchsbaum (Prentice-Hall, Inc., 1978) for conversion from A.W.G. to inches.

The alternators used in the system of FIG. 2 have a unique coil winding configuration for each of their three coil windings which results in the production of voltage and current that will meet all of the requirements of an ambulance at high engine rpm and at low engine idle rpm. This unique coil winding configuration is shown in FIGS. 4 and 5. Thirteen A.W.G. (American Wire Gage) copper wire is used to form the windings which are connected together in a Y configuration.

Referring to FIGS. 4 and 5, the unique coil winding configuration will be described. The coil winding in these figures is for one phase and it is identified as winding 334 of alternator 321. The coil winding configuration for the other two phases, coil windings 333 and 335 is the same as that of coil winding 334. As seen in FIG. 4, the outer edge 334-1A of coil 334-1 has three turns of wire. The outer edge 334-14B of coil 334-14 has two turns of wire. The total turns formed between adjacent coils from adjacent coils 334-1 and 334-2 to adjacent coils 334-12 and 334-14 are as follows: 5, 5, 5, 5, 5, 5, 5, 5, 5, 5, 5, 5, 5. The turns of the left hand edges of coils 334-1 to 334-14 as seen in FIG. 4 are as follows: 2, 3, 2, 3, 2, 3, 2, 3, 2, 3, 2, 3, 2, 2. The turns of the right hand edges of coils 334-1 to 334-14 as seen in FIG. 4 are as follows: 3, 2, 3, 2, 3, 2, 3, 2, 3, 2, 3, 2, 3, 2.

In the stator core of FIG. 5, edges 334-1A and 334-14B of the coil winding 334 are located in slot 241-1. Starting with slot 241-1 and going counterclockwise, it can be seen that every third slot has the following number of turns of windings 334 located therein: 5, 5, 5, 5, 5, 5, 5, 5, 5, 5, 5, 5, 5,.

In FIG. 5, only the edge of the coil winding 334 having the turns 2, 3, 2, 3, 2, 3, 2, 3, 2, 3, 2, 3, 2, 2 is shown. In FIG. 4, core segments 243-1, 243-2, and 243-3 encircled by coil 334-1 and core segments 243-4, 243-5 and 243-6 encircled by coil 334-2 are depicted by dotted lines. In FIG. 4, the relative distance between the segments is not shown to scale.

Each of the coil windings 333 and 335 is the same as coil winding 334. The turns of adjacent coils of windings 333 will be located in every third slot starting with slot 241-42 and going counterclockwise. The outer edges of the outer coils of winding 333 will be located in slot 241-42. Thus starting with slot 243-42 and going counterclockwise, every third slot will have the following number of turns of winding 333 located therein: 5, 5, 5, 5, 5, 5, 5, 5, 5, 5, 5, 5, 5, 5. With the turns of the coils so located in every third slot, each coil or loop of winding 333 will encircle three segments 243. The turns of adjacent coils of winding 335 will be located in every third slot starting with slot 241-2 and going counterclockwise. The outer edges of the outer coils of winding 335 will be located in slot 241-2. Thus starting with slot 241-2 and going counterclockwise, every third slot will have the following number of turns from winding 335 located therein: 5, 5, 5, 5, 5, 5, 5, 5, 5, 5, 5, 5, 5. With the turns of coil 35 so located in every third slot, each coil or loop of winding 335 will encircle three segments 243.

An alternator as described above and having the three winding configurations as described in connection with FIGS. 4 and 5, connected in a Y and formed of thirteen A.W.G. copper wire will produce a high output at both high and low engine rpm. Tests have shown the alternator to produce the following output in amps at the given engine rpm. This was for a 3 to 1 ratio where the alternator rotor was turning three times as fast as the engine. 57 amps at 800 rmp; 64 amps at 850 rpm; 72 amps at 1000 rpm; 87 amps at 1250 rpm; 95 amps at 1500 rpm; 98 amps at 1700 rmp; 100 amps at 1800 rpm; 102 amps at 2000 rpm; 104 amps at 2200 rpm; and 107 amps at 2900 rpm. In a dual configuration, the alternators adequately provide enough current at low engine idle to operate the equipment of an ambulance. In other types of vehicles such as taxis or school buses the alternator may be used in a single configuration.

For use on buses and in some ambulances, diodes 401 and 403 will be employed in lead 353 and 361 respectively. These diodes are provided to isolate the two alternators from each other. This prevents one alternator from being predominate and cutting the other alternator off. This is undesirable since as stated above, if an alternator is electrically turned off while the engine is running, its rotor will continue to turn with no current to the rotor. This has been found to be undesirable since it results in premature deterioration of the brushes of the alternator and hence reduces the lifetime of the alternator.

I claim

1. In a motor vehicle which includes electrically operated means employed in the operation of said vehicle and which carries electrically operated equipment used for emergency purposes, an electrical power system, comprising:
   a first battery having a positive terminal coupled to said electrically operated means,
   a second battery,
   first alternator means driven by the engine of said motor vehicle and having an output lead,
   second alternator means driven by the engine of said motor vehicle and having an output lead,
   means for coupling said electrically operated equipment to said two output leads,
   first electrical lead coupled to said two output leads and to the positive terminal of said first battery,
   second electrical lead coupled to said two output leads and to the positive terminal of said second battery,
   first diode means coupled to said first electrical lead for allowing the flow of current only from said two output leads to said first battery,
   second diode means coupled to said second electrical lead for allowing the flow of current only from said two output leads to said second battery,
   first regulator means for regulating the electrical voltage applied to said first alternator means,
   second regulator means for regulating the electrical voltage applied to said second alternator means,
   third electrical lead coupled to said output lead of said first alternator means and to the input of said first regulator means,
   third diode means coupled to said third electrical lead for allowing the flow of current only from said output lead of said first alternator means to said input of said first regulator means,
   fourth electrical lead coupled to said output lead of said second alternator means and to the input of said second regulator means, and
   fourth diode means coupled to said fourth electrical lead for allowing the flow of current only from said output lead of said second alternator to said input of said second regulator means.

* * * * *